United States Patent [19]

Donahue et al.

[11] Patent Number: 5,298,319

[45] Date of Patent: Mar. 29, 1994

[54] MOLDABLE AUTOMOTIVE TRUNK LINER

[75] Inventors: John M. Donahue; Christopher H. Gardner, both of Easley; John Owens, Seneca, all of S.C.

[73] Assignee: Phillips Petroleum Company, Bartlesville, Okla.

[21] Appl. No.: 850,755

[22] Filed: Mar. 13, 1992

[51] Int. Cl.$^5$ .................. B32B 27/36; B32B 5/06; B32B 5/22

[52] U.S. Cl. .................. 428/284; 428/286; 428/287; 428/300; 428/301; 428/298

[58] Field of Search .............. 428/284, 286, 287, 300

[56] References Cited

U.S. PATENT DOCUMENTS

| | | | |
|---|---|---|---|
| 4,269,884 | 5/1981 | DellaVecchia et al. | 428/131 |
| 4,320,167 | 3/1982 | Wishman | 428/288 |
| 4,416,936 | 11/1983 | Erickson et al. | 428/286 |
| 4,673,207 | 6/1987 | Reynolds et al. | 296/39 R |
| 4,695,501 | 9/1987 | Robinson | 428/287 |
| 4,721,641 | 1/1988 | Bailey | 428/88 |
| 4,801,169 | 1/1989 | Queen et al. | 296/39.1 |
| 4,851,274 | 7/1989 | D'Elia | 428/113 |
| 4,851,283 | 7/1989 | Holtrop et al. | 428/284 |

Primary Examiner—George F. Lesmes
Assistant Examiner—Kathryne Elaine Shelborne
Attorney, Agent, or Firm—Richmond, Phillips, Hitchcock & Umphlett

[57] ABSTRACT

A moldable fibrous composite comprising a first layer comprising a non-woven fabric, a second intermediate layer comprising a thermoformable material, and a third layer comprising a non-woven fabric is provided. This moldable fibrous composite can be utilized to form a one-piece trunk liner for an automobile trunk compartment. Additionally, the thermoformable material can be comprised of the same polymeric material as that of the staple fiber of the non-woven fabric of the first and third layer, thereby allowing recyclability of the moldable fibrous composite. A method is provided for the production of the moldable fibrous composite, and, additionally, a method is provided for the production of a moldable automotive trunk liner.

18 Claims, 3 Drawing Sheets

MOLDABLE AUTOMOTIVE TRUNK LINER

BACKGROUND OF THE INVENTION

The present invention relates to moldable non-woven laminates and more particularly concerns moldable non-woven laminates that can be used for trunk liners for an automobile trunk compartment.

In the fabrication of automotive trunk liners, it is common to utilize an integrally molded fibrous trunk liner wherein the trunk liner is molded in such a manner that the sidewalls thereof are formed so as to extend upwardly and outwardly in a diverging manner relative to the center floor cover panel so as to resiliently engage the sidewalls of the trunk compartment when the sidewalls of the liner are biased inwardly toward an upright position when installed and mounted in a trunk compartment. This resilient engagement of the trunk liner with the walls of the trunk compartment facilitates the mounting of the trunk liner in the trunk compartment and the maintaining of the trunk liner in the installed position and engagement with the walls of the trunk compartment.

Generally, such a trunk liner is formed from a moldable felt applied to the backside of a non-woven fabric. This felt serves to impart shape retention and stiffness to the overall molded body upon the molding operation being completed. The upper surface is formed of soft fibrous material for an aesthetically pleasing appearance. The backside felt must be comprised of material that is capable of being thermoformed at temperatures that will not damage the look or feel of the upper surface material. For this reason, the upper surface material and the backside coating material are generally produced from dissimilar materials, thereby preventing trim or other waste from being reprocessed or recycled. It bas been estimated that between 20 and 40 percent of the material utilized to produce current trunk liners becomes waste material, which results in excessive production costs.

It is an important object of the present invention to produce a thermoformable non-woven laminate in which all of the materials of the laminate are compatible and are thus capable of being recycled.

It is another object of this invention to produce an integral molded trunk liner wherein the materials of the trunk liner are compatible and are thus capable of being recycled.

It is a further object of this invention to produce an integral molded trunk liner with increased bulk thickness and increased acoustical value.

Other and further objects, aims, purposes, features, advantages, embodiments, and the like will be apparent to those skilled in the art from the present specification, taken with the associated drawings, and the appended claims.

More particularly, in one aspect, the present invention relates to a moldable fibrous composite comprising a first layer comprising a non-woven fabric, a second intermediate layer comprising a thermoformable material, and a third layer comprising a non-woven fabric. In accordance with another aspect of this invention, the three layers of the composite of the present invention are compatible with each other in order to provide for recyclability of the fibrous composite. In accordance with this aspect, the first and third layers of the composite each comprise a non-woven fabric comprised of polypropylene fibers. A second layer comprises an extruded thermoplastic sheet comprised of polypropylene. In accordance with another aspect of this invention, a process is provided for producing a moldable fibrous composite comprising a first layer comprising a non-woven fabric, a second intermediate layer comprising a thermoplastic resin, and a third layer comprising a non-woven fabric.

In the drawings, further preferred embodiments and details of this invention are shown. These drawings should, however, not be interpreted to unduly limit the scope of this invention.

DETAILED DESCRIPTION OF THE INVENTION

Figure 1:
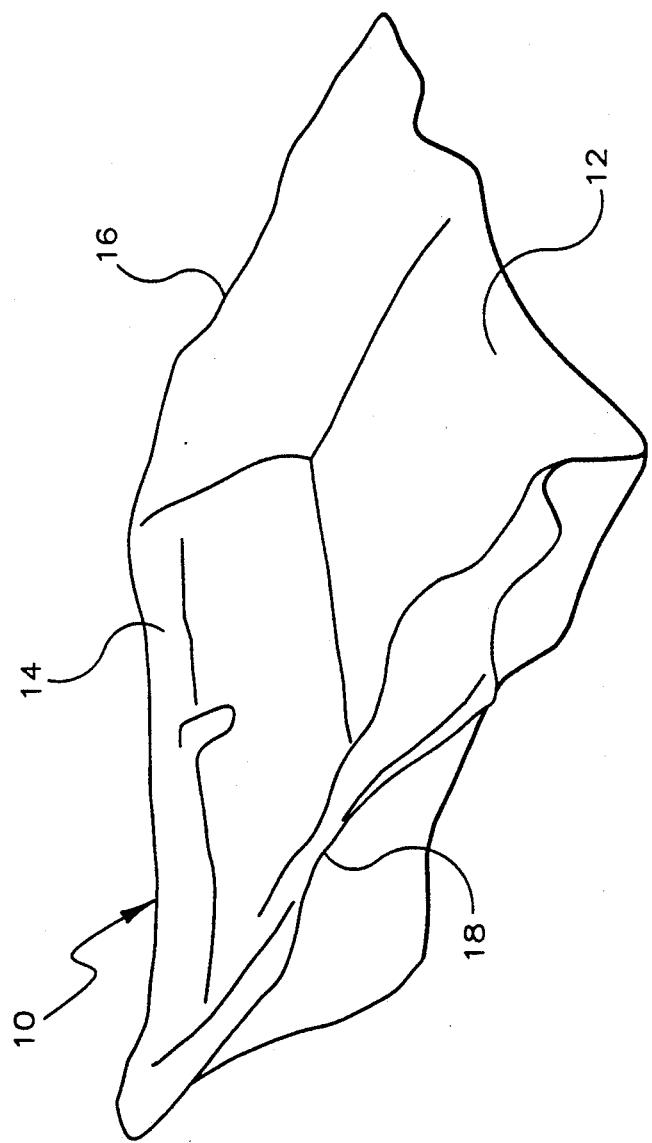
FIG. 1 is a top perspective view of the trunk liner of the present invention substantially as the same appears when taken out of the mold.

Referring now to the drawings and to FIG. 1 in particular, the trunk liner 10 of the present invention is shown as removed from a typical pressure molding operation utilizing mating male and female molding components. The trunk liner 10 comprises a center floor cover panel 12 and a plurality of panels extending along the sides of said center floor cover panel 12 and integrally connected thereto. These panels include a rear end panel 14 having lower end portions connecting rear most portions of the floor cover panel 12 and divergently extending upwardly and outwardly therefrom. A first rear wheel housing cover panel 16 and a second rear wheel housing cover panel 18 are connected to opposite sides of the center floor cover panel 12 and divergently extend upwardly and outwardly therefrom.

Figure 2:
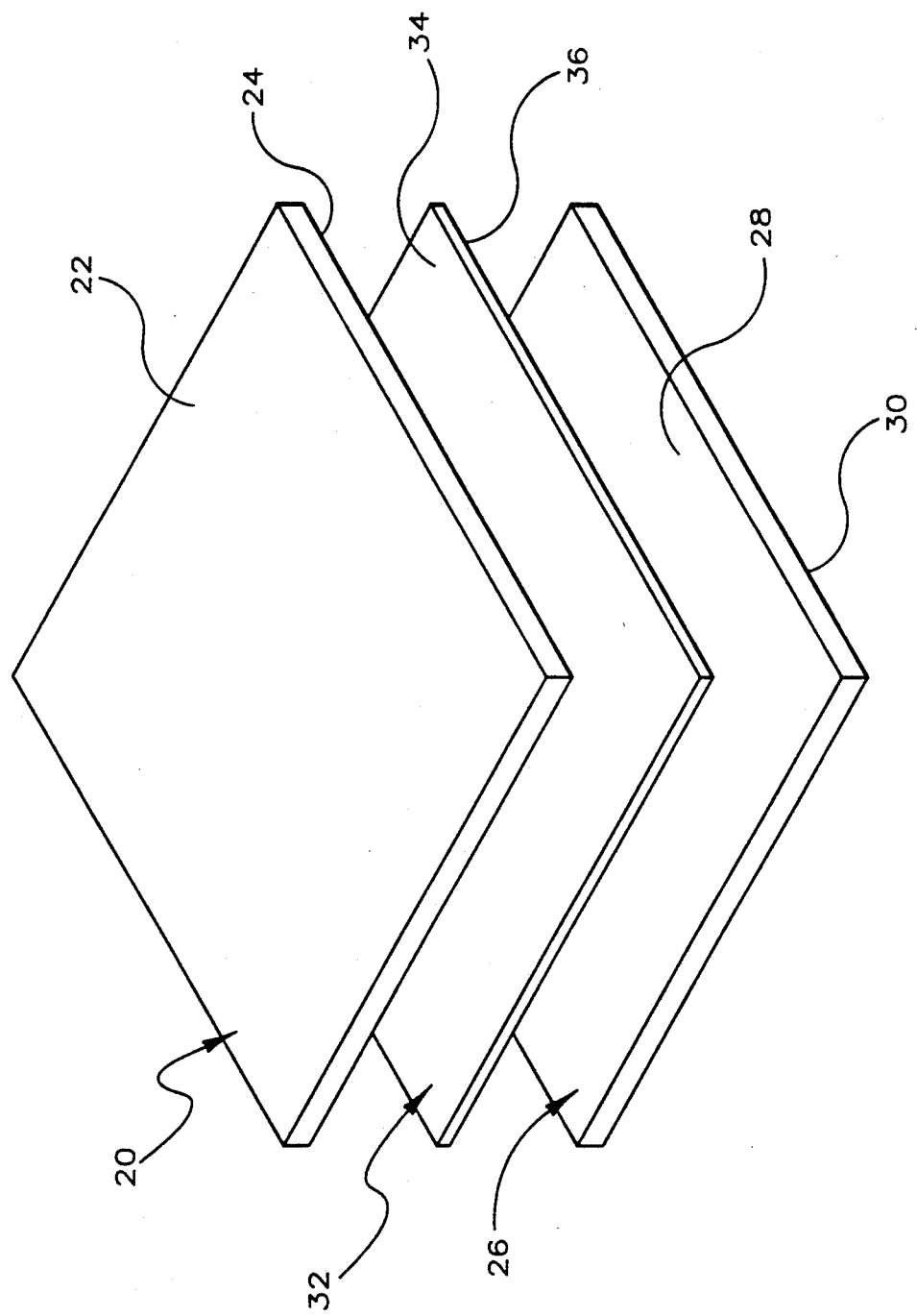
FIG. 2 is an isometric view of the moldable fibrous composite of the present invention showing the layered configuration.

The molded trunk liner 10 is formed of a fibrous material that may readily be subjected to molding. FIG. 2 illustrates the preferred construction of moldable fibrous composite from which the trunk liner 10 of this invention is manufactured. The moldable fibrous composite is preferably a 3-ply laminate of a first non-woven fabric 20 having a first face 22 and a second face 24, a second non-woven fabric 26 having a first face 28 and a second face 30, and an extruded thermoformable material 32 having a first face 34 and a second face 36. The first non-woven fabric 20 is bonded to the second non-woven fabric 26 by the extruded thermoformable material 32. The second face 24 of the first non-woven fabric 20 is bonded in contact with the first face 34 of the extruded thermoformable material, while the first face 28 of the second non-woven fabric 26 is bonded in contact with the second face 36 of the extruded thermoformable material 32 so that the first face 22 of the first non-woven fabric is exposed as the top surface of the moldable fibrous composite while the second face 30 of the second non-woven fabric is exposed as the bottom surface of the moldable fibrous composite.

Because the first face 22 of the first non-woven fabric 20 will be exposed within the trunk, it is important that the first non-woven fabric 20 comprise a material that has aesthetically pleasing look and feel as well as a material that is durable and tear resistant. The extruded thermoformable material 32 serves to impart shape retention and stiffness to the overall molded body upon the molding operation being completed. The second non-woven fabric 26 serves to increase the bulk or thickness of the moldable fibrous composite in order to increase the rigidity or stiffness of the molded part. Additionally, the second non-woven fabric 26 aids in the overall acoustical value of the part by preventing the extruded thermoformable material from having intimate contact with the exposed sheet metal within the trunk. Further, the second non-woven fabric 26 substantially improves the tear resistance of the composite.

In accordance with one aspect of this invention, the moldable fibrous composite utilized to form the automotive trunk liner of the present invention is comprised of a tri-laminate as shown in FIG. 2, wherein the first non-woven fabric 20, the second non-woven fabric 26 and the extruded thermoformable material 32 are each comprised of the same polymeric material so that trim or other composite waste can be reprocessed or recycled. In a preferred embodiment, the first non-woven fabric 20, the second non-woven fabric 26, and the extruded thermoformable material 32 are each comprised of polypropylene.

In such an embodiment, the first non-woven fabric 20 and the second non-woven fabric 26 are each comprised of polypropylene staple fibers. Staple fibers suitable for use in the present invention can be selected from staple fibers having lengths ranging from about 2 to about 5 inches. Good results have been attained employing a staple length ranging from about $3\frac{1}{4}$ to about 4 inches. Staple denier can be selected from a wide range of deniers. Normally the denier ranges from about 1 to about 20. The first non-woven fabric has a weight ranging from about 5 to about 7 ounces per square yard preferably about 5.5 to about 6.5 ounces per square yard. The second non-woven fabric 26 has a weight ranging from about 2 to about 4 ounces per square yard preferably about 2.5 to about 3.5 ounces per square yard. The extruded thermoformable material 32 must be compatible with the polypropylene staple fibers of the first non-woven fabric 20 and the second non-woven fabric 26 while also being capable of being thermoformed at temperatures that will not damage the look of feel of the first non-woven fabric 20 or the second non-woven fabric 26. Accordingly, the extruded thermoformable material 32 is comprised of from about 50% to about 100% polypropylene, from about 0% to about 10% ultra-low density polyethylene, from about 0% to about 20% particulate filler, from about 0% to about 10% carbon black, and from about 0% to about 8% foaming agent, by weight.

The addition of from about 0% to about 10% ultra-low density polyethylene by weight to the polypropylene helps the thermoforming operation by allowing the thermoformable material 32 to mold in process easier while also lowering the heat required to thermoform the material. The addition of this amount of ultra-low density polyethylene does not significantly decrease the recycling compatability of the thermoformable material 32 and allows the thermoformable material 32 to remain compatible with the first non-woven fabric 20 and the second non-woven fabric 26.

The addition of a particulate filler to the composition of the extruded thermoformable material 32 increases the modulus and stiffness of the resulting fibrous composite while additionally providing a more economical composition. While calcium carbonate is presently preferred as a particulate filler in the present invention, such fillers may be selected from a wide variety of minerals, metals, metal oxides, siliceous materials, metal salts, and mixtures thereof. These fillers may optionally be treated with various coupling agents or adhesion promoters, as is known to those skilled in the art. Additionally, small amounts of carbon black can be added to this material in order to blacken the color of the material. Foaming or blowing agents can also be added to the material in order to increase bulk and stiffness and result in greater thickness with less weight.

Apparatus suitable for the manufacture of a non-woven fabric such as first non-woven fabric 20 and second non-woven fabric 26, is described in detail in U.S. Pat. No. 4,042,655 issued to Platt et al and assigned to the assignees of the present invention, which patent is incorporated by reference herein. Such apparatus includes batt-forming means comprising two webb-forming trains in which feed means, such as bale breakers, blender boxes, feed boxes, etc., feed fibers in the form of staple, such as polypropylene fiber staple, to breaker carding machines. The carding machines produce carded webs of intermixed fibers which are picked up by take-off aprons of crosslappers. The crosslappers also comprise lapper aprons which traverse a carrier means such as intermediate aprons in a reciprocating motion thus laying webs to form intermediate batts on the intermediate aprons. The intermediate batts are passed to finisher carding machines by the intermediate aprons. The carding machines produce carded webs which are picked up by additional take-up aprons associated with additional crosslappers. The additional crosslappers also comprise additional lapper aprons which form a batt of fibers as the additional lapper aprons traverse a floor apron. The carded webs passing from the additional crosslappers are laid on the floor apron to build up several thicknesses to produce the previously mentioned batt.

As used through the instant specification, the term "fill direction" means the direction transverse to the direction of movement of the batt on the floor apron. The term "warp direction" means the direction parallel to the direction the batt moves on the floor apron, which is sometimes referred to as the machine direction.

First warp-drafting means, comprising at least two sets of nip rolls or an inlet apron in one set of nip rolls, is preferably used to draft the batt in the warp direction. As used herein, the term stretching, drawing, and drafting are synonymous.

The warp-drafted batt is then passed to a needle loom wherein the batt is needled at a suitable density, generally in the range of from about 100 to about 1,000 punches per square inch (about 15 to about 155 punches per square centimeter) and more preferably in the range from about 300 to about 500 punches per square inch (about 46 to about 78 punches per square centimeter). The needle penetration distance during needle punching is generally in the range of from about 5 to about 10 millimeters and more preferably in the range from about 6 to about 8 millimeters. A penetration of less than 5 millimeters is generally not sufficient to properly bind the staple fibers, however, a small needle penetration is desired in the present invention so that the resulting non-woven fabric will have greater thickness and therefore an appearance of more bulk. A needle penetration in the range of from about 6 to about 8 millimeters is sufficient to properly bind the staple fibers while maintaining maximum resulting thickness of the non-woven fabric.

The warp-drafted and needled batt is then subjected to additional drafting in the warp direction by second warp-drafting means. Generally, the needled batt of the first non-woven fabric 20 is warp-drafted with an overall draft percentage ranging from about 7% to about 15% and more preferably in the range from about 8% to about 10%. The needled batt of the second non-woven fabric 26 is warp-drafted with an overall draft percentage ranging from about 20% to about 35% and more preferably in the range of from about 22% to about 26%.

The batt is then preferably passed over a roll to fill-drafting means, such as a tenter frame. A suitable tenter frame comprises a fill-drafting section and a tensioning section. The tensioning section is not used to draft the batt, but is rather employed to subject the batt to tension in the fill direction subsequent to the application of fill-drafting to the batt. The resulting fabric is then rolled onto storage rolls.

Figure 3:
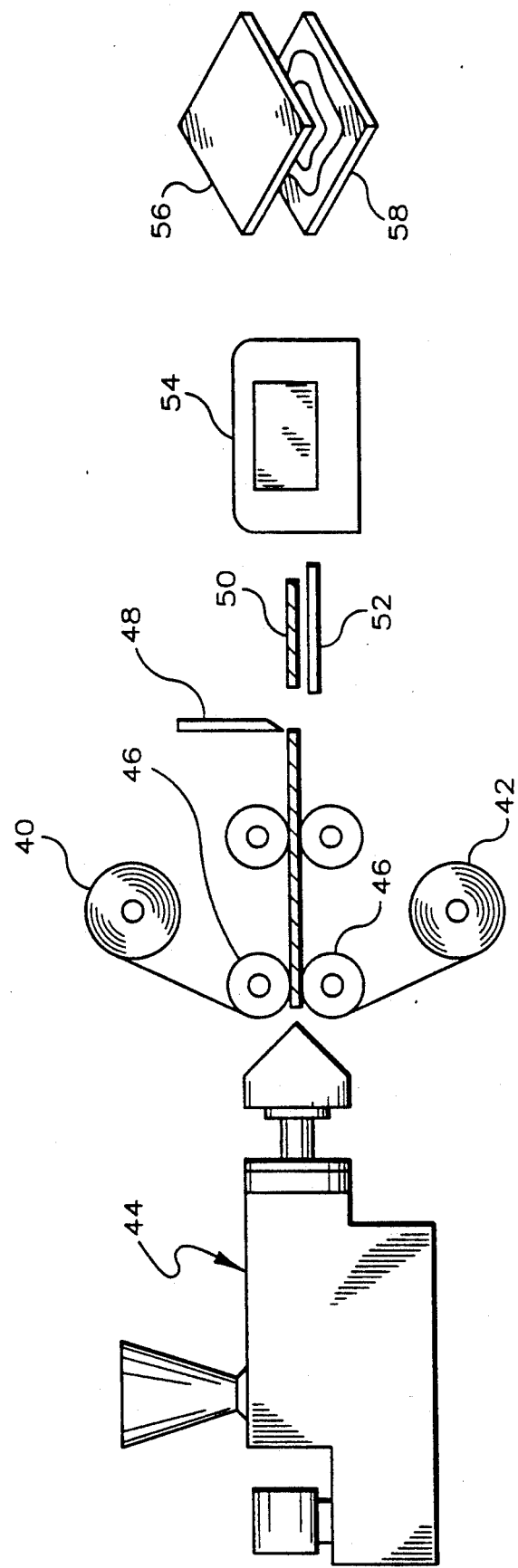
FIG. 3 is a schematic representation of a system for producing the moldable fibrous composite sheets of the present invention.

A method of manufacturing the improved trunk liner of the present invention is illustrated in schematic form in FIG. 3. As shown therein, first non-woven fabric 20 from a supply roll 40 and second non-woven fabric 26 from a supply roll 42 are brought in to juxtaposition and thermoformable material 32 from extruder 44 is deposited uniformly therebetween to form the desired laminated composite structure. Extruder 44 may be any of the commercially available extrusion devices which, in known manner can, under beat and pressure soften the thermoformable material and force it under control out of a die.

Pull rollers 46 move the composite structure after lamination to a shearing station 48 where the composite structure is cut to predetermined dimensions. The cut composition structure is preferably sized so that it will overlie to a desired extent the trunk well of a particular vehicle model.

The cut composite structure 50 can then be transported, e.g. on a pallet 52, to a preheating station where, after removal from the pallet, it is heated in an oven 54 or equivalent structure to a temperature at which it is formable. The preheated composite structure is then shaped by molding, preferably between a match set die comprising a female vacuum die 56 and male plug die 58. The dies are constructed so as to form the composite structure into the proper configuration as shown in FIG. 1. The molded structure is then allowed to cool and is then trimmed to produce the pre-shaped trunk liner 10 with the outstanding attributes described herein.

All the waste; scraps, and off-quality goods from the composite structure could then be chopped or ground into smaller particles and heated, melted, extruded, and pelletized into a configuration readily able to be extruded again. These reclaimed or recycled pellets could be added to the virgin resin pellets at the feed section of the extruder 44 up to a certain percentage that would processable without harming final extrudate properties. This would result in lower extruder resin costs, while also lowering the trunk liner producers' costs by eliminating the need for disposal of the waste.

EXAMPLES

The following examples are provided to further illustrate the invention and are not to be considered as unduly limiting the scope of this invention.

The non-woven fabrics used in the following example were produced as described here. The first non-woven fabric and the second non-woven fabric were prepared by using polypropylene staple fibers, 10 denier, 3½ inches long, carding the staple fibers to form a web, feeding the thus formed web to a crosslapper to provide additional thickness, stretching the web in a warp direction, and needle punching the stretched web. The non-woven fabrics are needle-punched on a needle loom using one barb needles with the barb located about 2½ mm above the point of the needles. The density of the needles used to make the non-woven fabrics are approximately 300 needles per linear inch of needle board. The material formed for the first non-woven fabric was a non-woven web of 6 ounces per square yard. This first non-woven fabric was needle punched with a needle penetration of 7 millimeters. After needle punching, the first non-woven fabric was again stretched in the warp direction at a ratio of about 1.093/1. The material formed for the second non-woven fabric was a non-woven web of 3 ounces per square yard. This second non-woven fabric was needle punched with a needle penetration of 7 millimeters. After needle punching, this second non-woven fabric was again stretched in the warp direction at a ratio of about 1.24/1. After needle punching and the subsequent warp drafting, the web of the first non-woven fabric and the web of the second non-woven fabric are each passed over a tenter frame to subject the batt to tension in the fill direction subsequent to the application of fill-drafting to the batt. Each resulting fabric is then rolled onto storage rolls. The first non-woven fabric and the second non-woven fabric are then brought into juxtaposition and thermoformable material from an extruder is deposited uniformaly therebetween to form the desired laminated composite structure. In this example, four different composite structures were prepared using the four different extrudates as shown in Table 1.

TABLE I

| | % Polypropylene | % ULDPE[1] | % Calcium Carbonate | % Foaming[2] Agent | Carbon Black |
|---|---|---|---|---|---|
| Extrudate A | 94 | 4 | 0 | 0 | 2 |
| Extrudate B | 88 | 10 | 0 | 0 | 2 |
| Extrudate C | 90 | 4 | 0 | 4 | 2 |
| Extrudate C | 84 | 4 | 6 | 4 | 2 |

[1]Ultra low density polyethylene sold under the trademark Attane by Dow Chemical Corp.
[2]foaming agent sold under the product designation 10104 from Ampacet Corp.

Each of the four resulting composites were heated and then thermoformed between a match set die comprising a female vacuum die and a male plug die. The composite comprising Extrudate A exhibited superior moldability with no degradation to the non-woven face material. The bending modulus for the composite comprising Extrudate A was considered superior while the thickness of this composite was considered adequate.

The composite comprising Extrudate B exhibited superior moldability with no thermal degradation to the non-woven face material. The thickness of the composite comprising Extrudate B was considered adequate; however, the bending modulus of this composite was considered unacceptable.

The composite comprising Extrudate C exhibited superior moldability with no thermal degradation to the non-woven face material. The bending modulus and the thickness of this composite were both considered superior.

The composite comprising Extrudate D exhibited superior moldability with no thermal degradation to the non-woven face material. This composite also exhibited a superior bending modulus and thickness.

That which is claimed is:

1. A moldable fibrous composite comprising:
a first layer having a first face and a second face wherein said first layer comprises a non-woven fabric consisting essentially of polypropylene staple fiber;
a second layer having a first face and a second face wherein said first face of said second layer is adjacent to said second face of said first layer and wherein said second layer comprises an extruded thermoformable material comprising polypropylene; and
a third layer having a first face and a second face wherein said first face of said third layer is adjacent to said second face of said second layer and wherein said third layer comprises a non-woven fabric consisting essentially of polypropylene staple fiber.

2. A moldable fibrous composite in accordance with claim 1, wherein said extruded thermoformable material of said second layer comprises at least about 50% polypropylene.

3. A moldable fibrous composite in accordance with claim 2, wherein said extruded thermoformable material of said second layer comprises in terms of weight less than about 10% ultra-low density polyethylene.

4. A moldable fibrous composite in accordance with claim 2, wherein said extruded thermoformable material of said second layer comprises in terms of weight less than about 8% foaming agent.

5. A moldable fibrous composite in accordance with claim 2, wherein said extruded thermoformable material of said second layer comprises less than about 20% particulate filler.

6. A moldable fibrous composite in accordance with claim 2, wherein said extruded thermoformable material of said second layer comprises in terms of weight less than about 10% carbon black.

7. A moldable fibrous composite in accordance with claim 1 wherein said first non-woven fabric bas a weight in the range of from about 5 ounces per square yard to about 7 ounces per square yard, and wherein said second non-woven fabric has a weight in the range of from about 2 ounces per square yard to about 4 ounces per square yard.

8. A moldable fibrous composite in accordance with claim 7, wherein said first non-woven fabric and said second non-woven fabric have been needle-punched with a needle penetration in the range of from about 5 millimeters to about 10 millimeters.

9. A moldable fibrous composite in accordance with claim 7, wherein said first non-woven fabric bas been drafted in the longitudinal direction in the range of from about 7% to about 15% after said first non-woven fabric bas been needle-punched and said second non-woven fabric has been drafted in the longitudinal direction in the range of from about 20% to about 35% after said second non-woven fabric bas been needle-punched.

10. A one-piece trunk liner for an automobile trunk compartment, said trunk liner comprising an integral molded relatively stiff fibrous body comprising a first layer having a first face and a second face wherein said first layer comprises a first non-woven fabric consisting essentially of polypropylene staple fiber;
a second layer having a first face and a second face wherein said first face of said second layer is adjacent to said second face of said first layer and wherein said second layer comprises an extruded thermoformable material comprising polypropylene; and
a third layer having a first face and a second face wherein said first face of said third layer is adjacent to said second face of said second layer and wherein said third layer comprises a second non-woven fabric consisting essentially of polypropylene staple fiber.

11. A one-piece trunk liner in accordance with claim 10, wherein said extruded thermoformable material of said second layer comprises at least about 50% polypropylene.

12. A one-piece trunk liner in accordance with claim 11, wherein said extruded thermoformable material of said second layer comprises in terms of weight less than about 10% ultra-low density polyethylene.

13. A one-piece trunk liner in accordance with claim 11, wherein said extruded thermoformable material of said second layer comprises in terms of weight less than about 8% foaming agent.

14. A one-piece trunk liner in accordance with claim 11, wherein said extruded thermoformable material of said second layer comprises less than about 20% particulate filler.

15. A one-piece trunk liner in accordance with claim 11, wherein said extruded thermoformable material of said second layer comprises in terms of weight less than about 10% carbon black.

16. A one-piece trunk liner in accordance with claim 10, wherein said first non-woven fabric has a weight in the range of from about 5 ounces per square yard to about 7 ounces per square yard, and wherein said second non-woven fabric has a weight in the range of from about 2 ounces per square yard to about 4 ounces per square yard.

17. A one-piece trunk liner in accordance with claim 16, wherein said first non-woven fabric and said second non-woven fabric have been needle-punched with a needle penetration in the range of from about 5 millimeters to about 10 millimeters.

18. A one-piece trunk liner in accordance with claim 16, wherein first non-woven fabric has been drafted in the longitudinal direction i-n the range of from about 7% to about 15% after said first non-woven fabric has been needle-punched and said second non-woven fabric has been drafted in the longitudinal direction in the range of from about 20% to about 35% after said second non-woven fabric has been needle-punched.

* * * * *

UNITED STATES PATENT AND TRADEMARK OFFICE
CERTIFICATE OF CORRECTION

PATENT NO.: 5,298,319

DATED: March 29, 1994

INVENTOR(S): John M. Donahue, Christopher H. Gardner, John Owens

It is certified that error appears in the above-identified patent and that said Letters Patent is hereby corrected as shown below:

| Col. | Line | |
|---|---|---|
| 6 | 55 | in the last line of Table I, patent reads:<br>"Extrudate C    84    4    6    4    2"<br>patent should read:<br>--Extrudate D    84    4    6    4    2-- |
| 7 | 57 | "non-woven fabric bas a weight" should read<br>--non-woven fabric has a weight-- |
| 8 | 2 | "first non-woven fabric bas been" should read<br>--first non-woven fabric has been-- |
| 8 | 5 | "bas been needle-punched" should read<br>--has been needle-punched-- |
| 8 | 8 | "non-woven fabric bas been needle-punched" should read   --non-woven fabric has been needle-punched-- |

Signed and Sealed this

Thirteenth Day of September, 1994

Attest:

BRUCE LEHMAN

Attesting Officer

Commissioner of Patents and Trademarks